United States Patent [19]
Haartsen

[11] Patent Number: 5,898,929
[45] Date of Patent: Apr. 27, 1999

[54] METHOD AND APPARATUS FOR SYNCHRONIZING PRIVATE RADIO SYSTEMS

[75] Inventor: Jacobus Cornelis Haartsen, Staffanftorp, Sweden

[73] Assignee: Telefonaktiebolaget L/M Ericsson (publ), Stockholm, Sweden

[21] Appl. No.: 08/697,905

[22] Filed: Aug. 30, 1996

[51] Int. Cl.⁶ .................................................. H04Q 7/20
[52] U.S. Cl. .................... 455/462; 455/436; 455/424; 370/503; 370/340; 375/356
[58] Field of Search .................... 455/422, 423, 455/424, 425, 426, 436, 454, 458, 461, 462, 465, 466, 502; 370/503, 507, 340, 350; 375/356

[56] References Cited

U.S. PATENT DOCUMENTS

| 5,109,528 | 4/1992 | Uddenfeldt | 455/33.2 |
|---|---|---|---|
| 5,212,684 | 5/1993 | MacNamee et al. | 370/24 |
| 5,428,668 | 6/1995 | Dent et al. | 379/59 |
| 5,519,710 | 5/1996 | Otsuka | 370/95.3 |
| 5,526,402 | 6/1996 | Dent et al. | 379/59 |
| 5,535,259 | 7/1996 | Dent et al. | 379/59 |

FOREIGN PATENT DOCUMENTS

| 2277232 | 10/1994 | United Kingdom . |
|---|---|---|
| 0168051 | 7/1985 | WIPO . |
| 9509497 | 4/1995 | WIPO . |
| 9608885 | 3/1996 | WIPO . |

*Primary Examiner*—Reinhard J. Eisenzopf
*Assistant Examiner*—Darnell R. Armstrong
*Attorney, Agent, or Firm*—Jenkens & Gilchrist, P.C.

[57] ABSTRACT

The present invention time and frequency synchronizes a plurality of private radio base stations operating in the coverage area of a land mobile communications network. The mobile network's control channels are used to derive a reference signal. A mobile terminal uses the reference signal to become synchronized both in time and frequency with the mobile network. Any of the private radio base stations that is linked in a traffic connection with the mobile terminal is synchronized with the mobile terminal. Consequently, the private radio base stations are indirectly synchronized with each other and also with the mobile communications network.

12 Claims, 5 Drawing Sheets

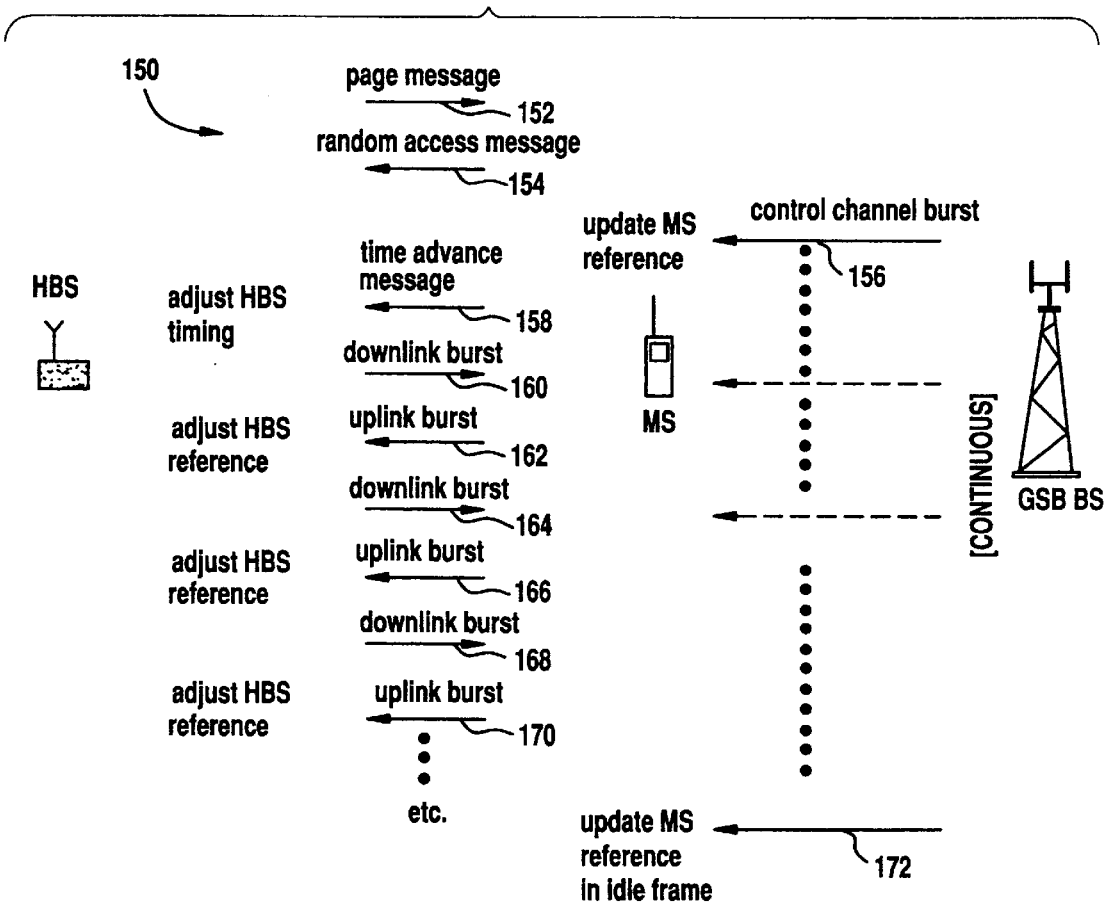
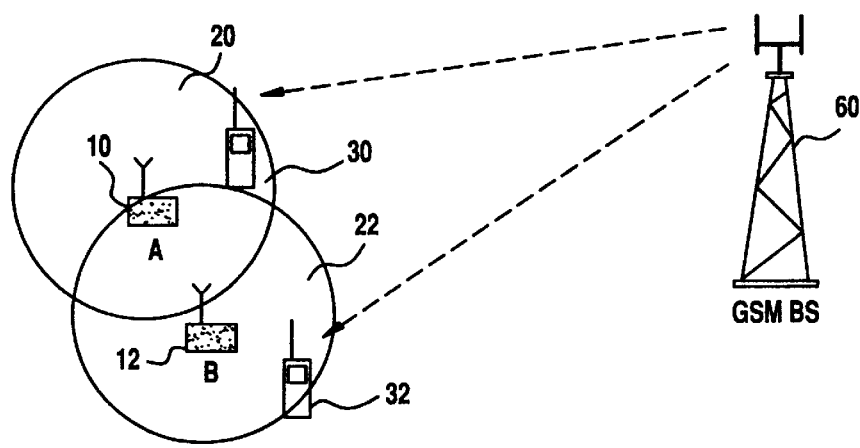

RSSI received in system B

Slot allocations in systems A and B 8-slot TDMA frame

RSSI received in system C

Slot allocations in systems A and B    8-slot TDMA frame

Slot allocations in system C

METHOD AND APPARATUS FOR SYNCHRONIZING PRIVATE RADIO SYSTEMS

BACKGROUND OF THE INVENTION

1. Technical Field of the Invention

The present invention relates generally to the wireless telecommunications field and, in particular, to a method and apparatus for synchronizing a plurality of private radio systems that are commonly using a mobile communications air interface and air protocol.

2. Description of Related Art

The commercial utilization of digital mobile communications systems for public telephony has grown tremendously during the past decade. For example, since the mid-1980's, a large number of digital cellular communications systems have been fielded for public use throughout the world, such as the Global System for Mobile communications (GSM) in Europe, the Personal Digital Cellular (PDC) System in Japan, and the Digital Advanced Mobile Phone System (DAMPS) in North America. However, although many of the technical specifications for these systems are different, the GSM air interface and protocol, which were created in Europe, are being used in many of the other cellular systems deployed throughout the world.

In business and residential environments, users of telephony services have limited mobility and, therefore, can be offered services not normally available to the highly mobile users of cellular networks. For example, U.S. Pat. Nos. 5,428,668 and 5,535,259 disclose a private radio base station, which is not an integral part of a disclosed cellular network, but is connected directly to a public switched telephone network (PSTN). When a mobile cellular terminal comes within radio range of a "home base station" (HBS) of the private system, the mobile terminal is converted operationally to a cordless phone. Using this cordless mode of operation, a user can realize numerous advantages over the cellular mode, such as the lower PSTN rates incurred, higher quality voice communications, and a substantially longer standby time.

Many similar and other advantages would be realized if a private radio system were to have an air interface that is compatible with a cellular network air interface. For example, a mobile terminal could be converted into a dual-mode cellular-HBS portable terminal, by downloading software from the mobile network or private system to implement the cordless mode of operation. Additionally, the private radio system's base station existing hardware could be used in such a dual-mode cellular-HBS operation, provided the base station's transmit and receive frequencies are exchanged.

However, an interference problem arises if a private radio system's HBS uses the same frequencies as those used by a cellular network, and their coverage areas overlap. Typically, in this situation, an operator would be required to dedicate one or more frequencies exclusively for use by the HBS. Consequently, even if the HBS coverage area were to overlap with that of the cellular network, the dedicated HBS frequencies would not interfere with those used by the network. Therefore, the HBS frequencies should be orthogonal to the cellular network's frequencies, and adjacent channel interference can then be avoided.

Frequencies in the radio spectrum are scarce, and there are not many carrier frequencies available for dedicated HBS use. Consequently, another interference problem arises if the coverage areas of different HBSs overlap. Since the different HBSs typically do not communicate with each other, it is important to appropriately allocate the HBS channels. Adaptive channel allocation techniques may be used to divide the available channels among the different HBSs, so that mutual interference will be minimized. However, an adaptive channel allocation technique is considered to be optimal only when the allocated channels are orthogonal to each other. For example, a GSM channel is defined by both a carrier frequency and a time slot. Frequency orthogonality means that a strict frequency spacing is maintained between consecutive carriers, so there is a minimal amount of adjacent channel interference. In the GSM, the specified accuracy for a base station carrier frequency is better than 0.05 ppm. Time slot orthogonality means that consecutive time slots do not overlap. The transmission of the TDMA bursts in a GSM cell is synchronized to the timing of the base station, which acts as a master reference. In this way, interference caused by overlapping bursts transmitted by different mobile terminals is prevented.

In that regard, another synchronization-related problem arises when HBS-based private radio systems are used. The cost of obtaining the highly accurate frequencies and timing needed to minimize interference is far too expensive for typical private radio systems. For example, in order to obtain the highly accurate carrier frequencies required in cellular networks, relatively expensive oven-controlled signal reference sources are used. For the typical private radio system, the use of such a high quality reference source would be too costly. Similarly, in order to obtain appropriate time synchronization, cellular base stations adjust all of the uplink and downlink channel timing. In order to suppress interference from other (non-synchronized) base stations, cellular networks employ frequency cell planning techniques to ensure that co-channel interference sources are separated by an appropriate distance.

On the other hand, in a private radio system environment, the HBS units are not coordinated with each other. Consequently, it is not technically (or economically) feasible for a private radio system user to institute frequency cell planning or relative time adjustments for the different HBSs in that or any nearby system. It is possible to use adaptive frequency planning techniques in private radio systems. However, the number of frequencies available for HBS use are usually insufficient to achieve desired frequency reuse distances in those areas where many HBSs are located close together. In that event, many of the HBSs would have to share the same carrier frequency. Therefore, in order for private radio system HBSs to obtain any desired channel reuse, time slot synchronization techniques could be employed so that a number of users could use the same carrier frequencies without experiencing traffic "collisions". Because of over-riding technical and cost considerations, it is preferable to time synchronize a plurality of private HBSs without having to provide interconnecting communications links between them.

A major frequency synchronization problem arises for users of private radio systems, because in order to minimize interference, the private HBSs should use carrier frequencies that are orthogonal not only to the surrounding cellular network frequencies, but also the frequencies of nearby HBSs. However, it would be far too expensive for private system users to incorporate the highly accurate reference sources typically used in cellular networks (e.g., GSM) into the private radio base stations or such consumer products as the private radiotelephones.

SUMMARY OF THE INVENTION

It is an object of the present invention to time and frequency synchronize a plurality of private radio base stations that are operating in the coverage area of a cellular mobile network.

It is also an object of the present invention to minimize interference between a plurality of private radio system base stations and a cellular mobile network.

It is yet another object of the present invention to synchronize a plurality of private radio system base stations and a cellular mobile network while minimizing the use of high accuracy reference sources and thereby minimizing cost.

In accordance with one aspect of the present invention, the foregoing and other objects are achieved by a method and apparatus for synchronizing a plurality of private radio base stations with a cellular mobile network, by synchronizing the private base stations with a mobile terminal that has been synchronized with the cellular mobile network. Consequently, the private radio system base stations are indirectly synchronized with each other.

In accordance with another aspect of the present invention, the foregoing and other objects are achieved by a method and apparatus for synchronizing a plurality of private radio base stations with a cellular mobile network, by synchronizing the private base stations with a mobile terminal that has been synchronized with the cellular mobile network. Consequently, interference between the private base stations is minimized.

In accordance with yet another aspect of the present invention, the foregoing and other objects are achieved by a method and apparatus for synchronizing a plurality of private radio base stations with a cellular mobile network, by synchronizing the private base stations with the cellular mobile network utilizing the downlink receiver in a mobile terminal. Consequently, high accuracy reference sources are not required to be used in the private base stations, which minimizes costs.

BRIEF DESCRIPTION OF THE DRAWINGS

A more complete understanding of the method and apparatus of the present invention may be had by reference to the following detailed description when taken in conjunction with the accompanying drawings wherein:

FIG. 3 is a sequence diagram that illustrates a method of synchronizing the timing and frequency of a private radio base station, a mobile terminal, and a cellular base station, in accordance with a preferred embodiment of the present invention;

FIG. 6 is a top level schematic block diagram that illustrates a method and apparatus that can be used to implement the timing and frequency synchronization of two private radio base stations and mobile terminals operating in a cellular network coverage area, in accordance with a preferred embodiment of the present invention;

DETAILED DESCRIPTION OF THE DRAWINGS

The preferred embodiment of the present invention and its advantages are best understood by referring to FIGS. 1–10 of the drawings, like numerals being used for like and corresponding parts of the various drawings.

Essentially, the present invention synchronizes (e.g., time and frequency) a plurality of private radio base stations operating in the coverage area of a cellular network. The cellular network's downlink control channels are used to derive a reference signal. A (cellular) mobile terminal linked in a traffic connection with a private radio base station is used to facilitate the synchronization.

Figure 1:
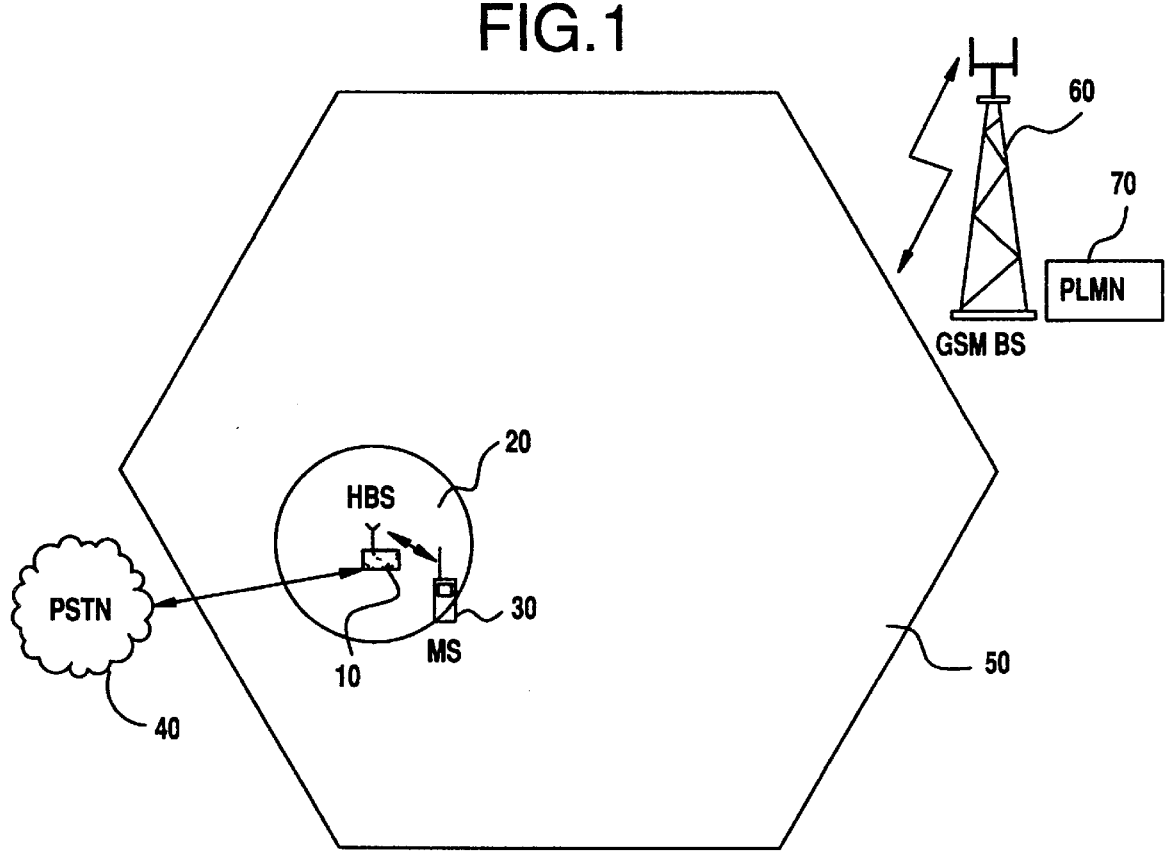
FIG. 1 is a top level schematic block diagram that illustrates an example of a private radio HBS operating in a mobile communications network coverage area.

FIG. 1 is a top level schematic block diagram that illustrates an example of a private radio HBS operating in a mobile communications network coverage area. A private radio system HBS 10 is shown, which defines a relatively small coverage area 20. A cellular mobile terminal 30, which is located within coverage area 20, is linked via an air interface to HBS 10. Mobile terminal 30 is operating with HBS 10 in a cordless mode. If located outside of HBS coverage area 20, but inside coverage area 50, mobile terminal 30 would be operating with base station 60 in a cellular mode. HBS 10 is connected via a wireline to a PSTN 40. Mobile terminal 30 and HBS 10 are located within a relatively large cellular coverage area 50, which is defined by base station 60. Base station 60 includes a transmitter/receiver section, and is a component part of a public land mobile network (PLMN) 70. In this illustrative example, PLMN 70 may be assumed to be the GSM. A detailed description of the structure and operation of a private radio HBS and a cellular mobile phone operating in a cordless mode is provided in U.S. Pat. Nos. 5,428,668 and 5,535,259.

In general, when HBS 10 attempts to set up a call to mobile terminal 30, HBS 10 transmits a paging message on its control frequency. At this point, assume that the HBS transmissions are not synchronized with the cellular network's transmissions. After receiving the HBS paging message, mobile terminal 30 initially tunes to the downlink control channel of the strongest cellular network's base station (60). The mobile terminal accomplishes this tuning relatively quickly, because the cellular base station tuned to is the same base station the terminal was linked to before it entered the cordless mode. By comparing the signals received from the HBS and cellular base station, the mobile terminal can determine what timing and frequency discrepancies exist between the two signals. The mobile station transmits a time alignment message to the HBS, but the message is transmitted using the original HBS timing. The HBS then adjusts it timing accordingly. Notably, to implement such a timing alignment, only slot synchronization information needs to be transmitted. Assuming that an adaptive slot allocation scheme is being used, no frame information needs to be transmitted. As a result of applying the above-described method, any remaining timing misalignment would fall within the range of plus or minus half a TDMA slot, which provides a coarse time alignment between the HBS and cellular base station transmissions.

Figure 2:
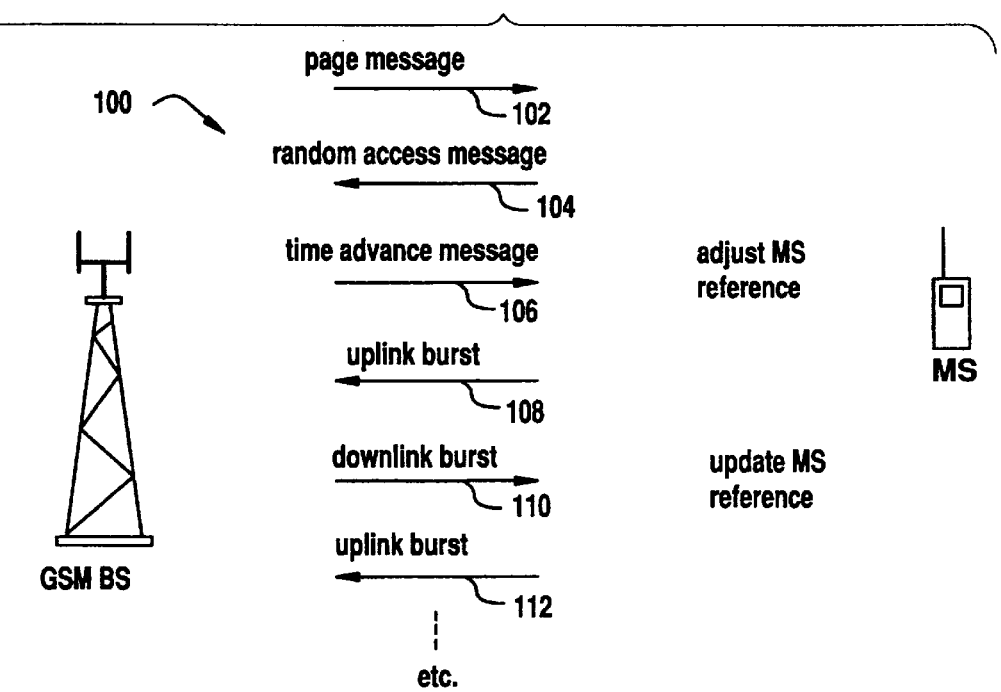
FIG. 2 is a sequence diagram that illustrates a method of fine tuning the timing and frequency synchronization of the cellular base station and mobile terminal transmissions described above with respect to FIG. 1.

FIG. 2 is a sequence diagram that illustrates a method of fine tuning the timing and frequency synchronization of the cellular base station and mobile terminal transmissions described above with respect to FIG. 1. In this case, the cellular base station functions as the synchronization reference. The method 100 begins at step 102, whereby the cellular base station (60) transmits a paging message on a paging channel, in order to set up a call. In return, at step 104, the mobile terminal (30) transmits a request for a signaling channel, on the base station's Random Access Channel (RACH). The mobile terminal's transmission provides timing information to the base station. At step 106, the base station transmits (one time) a timing advance (TA) message, which is used by the mobile station to update its timing reference. Consequently, at this point, the uplink timing is coarsely aligned.

At step 108, the mobile terminal transmits a message (e.g., traffic) to the base station on a signaling channel. At step 110, the base station transmits a message (e.g., traffic) to the mobile terminal on the signaling channel. The terminal uses the training sequence in the received burst to accurately adjust its reference, both for frequency and timing errors. The training sequence is a fixed bit pattern which is used to estimate the channel in the equalizer. This sequence also reveals timing and frequency errors. At step 112, the terminal then transmits the next message to the base station. Consequently, the uplink timing (and frequency) are finely aligned. Preferably, these timing and frequency alignments are performed in the terminal's equalizer and other baseband processing equipment, and they are performed continuously for as long as the terminal receives downlink information from the cellular base station.

Figure 4:
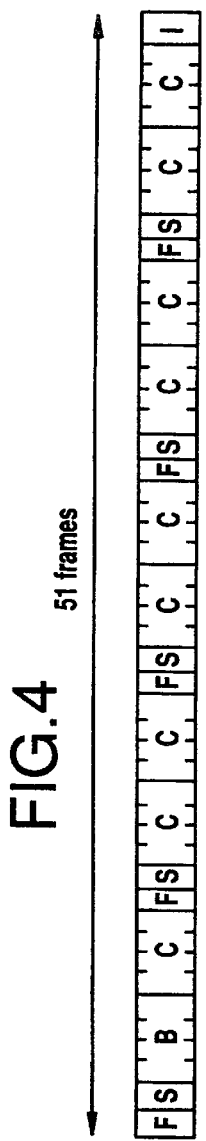
FIG. 4 is a diagram that illustrates a GSM broadcast control channel format.

FIG. 3 is a sequence diagram that illustrates a method of synchronizing the timing and frequency of a private radio base station 10, a mobile terminal 30, and a cellular base station 60, in accordance with a preferred embodiment of the present invention. In this embodiment, the mobile terminal 30 functions as the synchronization reference. The synchronization method 150 begins at step 152, whereby the private radio base station (10) transmits a paging message on a paging channel, in order to set up a call. In return, at step 154, the mobile terminal (30) transmits a request for a signaling channel, on the private base station's RACH. At step 156, the mobile terminal (30) listens to the cellular broadcast channel to synchronize its timing and frequency references. An example of such a broadcast channel (e.g., the GSM) is shown in FIG. 4. The terminal uses the frequency correction burst "F" and the synchronization burst "S" in this broadcast channel for initial synchronization, and subsequently uses the training sequence of bits in every received burst to update its timing and frequency reference. The cellular base station continuously transmits bursts with such control information on the downlink, which can be used by the terminal, at any time, to update its timing and frequency reference by just listening to the cellular base station.

Preferably, the mobile terminal's timing update occurs during the idle frames in the traffic channel established between the mobile terminal and the private radio base station. In other words, the mobile terminal's timing update preferably occurs when there is no communications between the private base station and the mobile terminal. In this embodiment, in order to update its timing reference, the mobile terminal tunes to the cellular network with the strongest signal. This timing update occurs every idle frame (e.g., once every 26 TDMA frames in the GSM), or it can occur less frequently if the mobile terminal's timing does not drift appreciably between updates. Notably, the mobile terminal adjusts its internal timing reference while it is "listening" to the cellular base station's downlink channel, and not while it is "listening" to the private base station's downlink channel.

Figure 5:
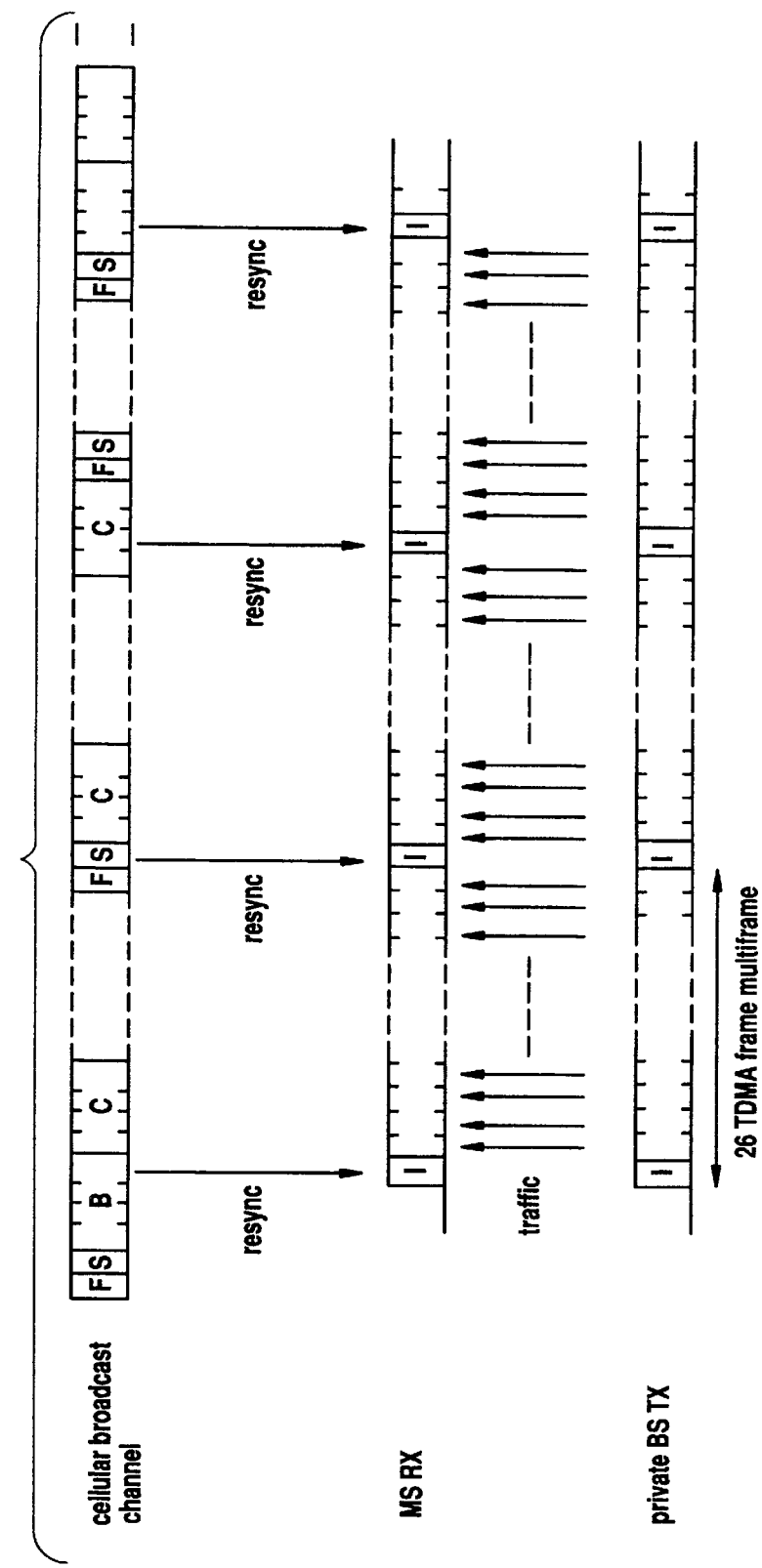
FIG. 5 is a diagram that illustrates a mobile terminal synchronizing with a cellular network base station during the idle frames of the traffic channel.

At step 158, the mobile terminal transmits a TA message over the private base station's signaling channel, which the private base station uses to adjust its internal timing reference. At step 160, the private base station transmits a message (e.g., traffic) over the signaling channel. At step 162, the mobile terminal transmits a message (e.g., traffic) over the signaling channel. The private base station uses the training sequences in the bursts received from the mobile terminal to adjust the private base station's timing and frequency references. The method is repeated at steps 164, 168, etc., where the mobile terminal listens to the downlink signals from the private base station, and at steps 166, 170, etc., the private base station listens to the uplink signals from the mobile terminal, and uses the received training sequences to update its timing and frequency reference. At step 172, the mobile terminal interrupts the communications to the private base station in order to listen to the downlink control channel of the cellular base station. The terminal then uses the training sequences in these cellular downlink signals to update its timing and frequency reference. This interruption preferably occurs during the idle frames in the connection to the private base station, during which time the mobile terminal does not have to listen to the private base station, since no information is being sent. A diagram that illustrates the mobile terminal synchronizing with the cellular network base station during the idle frames of the traffic channel is shown in FIG. 5. Consequently, in accordance with the method shown in FIG. 3, the mobile terminal is periodically synchronized in time and frequency with the cellular base station, and the private radio base station is synchronized in time and frequency with the mobile terminal during each uplink (traffic) message.

FIG. 6 is a top level schematic block diagram that illustrates a method and apparatus that can be used to implement the timing and frequency synchronization of two private radio base stations and mobile terminals operating in a cellular network coverage area, in accordance with a preferred embodiment of the present invention. Similar to the arrangement shown in FIG. 1, a first private radio base station 10 defines a relatively small coverage area 20. A first cellular mobile terminal 30 is located in coverage area 20. A second private radio system base station 12 defines a relatively small second coverage area 22. A second cellular mobile terminal 32 is located in coverage area 22. The two private radio base stations are located relatively close to each other.

Prior to the second private base station (12) allocating a time slot for transmission or reception, mobile terminal 32 synchronizes that private base station to the cellular base station (e.g., 60) having the strongest signal (as perceived by that terminal). Since the two private base stations (10, 12)

are located close to each other, it can be assumed that private base station 10 is also synchronized to the same cellular base station (60) via the operations of mobile terminal 32. Once the two private radio base stations are synchronized to the same cellular base station, they are also (indirectly) synchronized with each other. On the other hand, if the two private base stations are located far enough apart so that they are in the coverage area of different cellular base stations, each private base station can be separately synchronized to the respective cellular base station, in accordance with the synchronization methods described above.

Figure 7A:
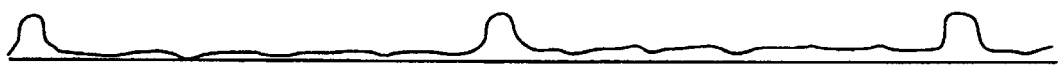
FIG. 7A is a diagram that illustrates a received signal strength indication in a signal received by a second private base station shown in FIG. 6.
Figure 7B:
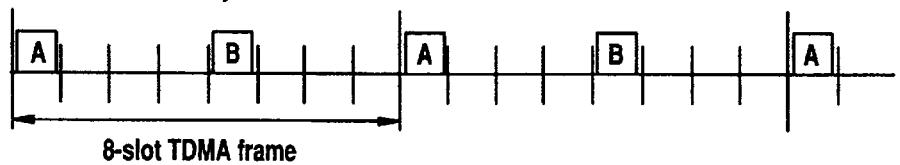
FIG. 7B is a diagram that illustrates time slot allocation, in accordance with a preferred embodiment of the present invention.

Returning to the illustration in FIG. 6, prior to adaptively allocating time slots, both the private base station (12) and the mobile terminal (32) scan their respective TDMA frame for an empty slot. For example, if the second private base station (12) detects a "received signal strength indication" (RSSI) in a received signal as shown in FIG. 7A, the private base station estimates the slot position of the first user (e.g., private base station 10) and allocates an empty slot for itself (e.g., private base station 12) far from the first slot's position. An example of such a time slot allocation is shown in FIG. 7B, in which A is the slot position selected by the first private base station (10), and B is the slot position selected by the second private base station (12). The cordless mode communications between the private base stations and their respective mobile terminals are then begun. Since the slot positions of the two private base stations are fixed relative to each other as a result of the timing synchronization, these slots remain orthogonal and thereby avoid collisions.

Figure 8:
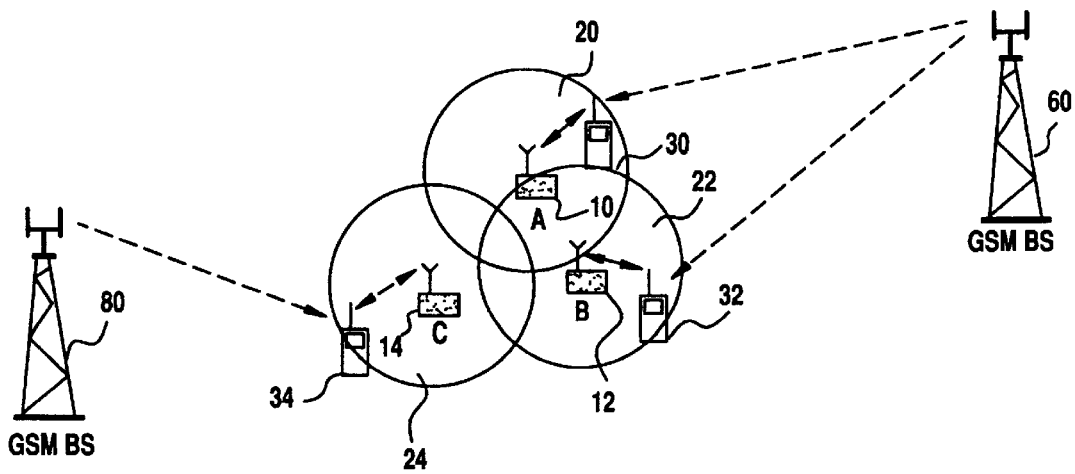
FIG. 8 is a top level schematic block diagram that illustrates a method and apparatus that can be used to implement the timing and frequency synchronization of three private radio base stations and mobile terminals operating in a cellular network coverage area, in accordance with a preferred embodiment of the present invention.

FIG. 8 is a top level schematic block diagram that illustrates a method and apparatus that can be used to implement the timing and frequency synchronization of three private radio base stations and mobile terminals operating in a cellular base station coverage area, in accordance with a preferred embodiment of the present invention. Similar to the arrangement shown in FIG. 6, a first private radio base station 10 defines a relatively small coverage area 20. A first cellular mobile terminal 30 is located in coverage area 20. A second private radio system base station 12 defines a relatively small second coverage area 22. A second cellular mobile terminal 32 is located in coverage area 22. The two private radio base stations are located relatively close to each other and in the relatively large coverage area of cellular network 60.

A third private radio base station 14 defines a relatively small third coverage area 24. A third cellular mobile terminal 34 is located in coverage area 24. Private radio base station 14 and mobile terminal 34 are located in the relatively large coverage area of a second cellular base station 80. In this embodiment, the base station 80 is part of a GSM network. Cellular base stations 60 and 80 are not necessarily synchronized with each other. However, they will have a fairly accurate reference source (e.g., in the GSM, an absolute accuracy of better than 0.05 ppm).

Figure 9A:
FIG. 9A is a diagram that illustrates a received signal strength indication in a signal received by a third private base station shown in FIG. 8.
Figure 9B:
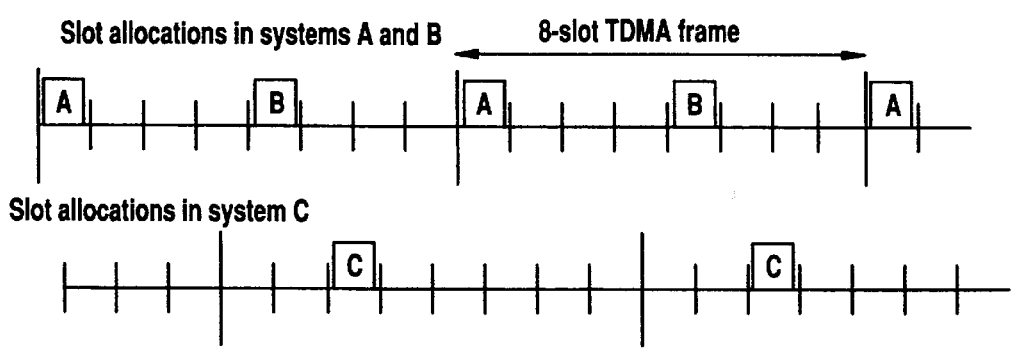
FIG. 9B is a diagram that illustrates time slot allocation, in accordance with a preferred embodiment of the present invention.

Prior to adaptively allocating time slots, the third private base station (14) and the mobile terminal (34) scan their respective TDMA frame for an empty slot. The third private base station (14) detects an RSSI in a received signal as shown in FIG. 9A, which can be misaligned by up to ± half a slot with respect to that private base station's timing. As shown in FIG. 9B, the third private base station then allocates itself a time slot C for transmission (or reception) as far away from the other two occupied time slots A and B (base stations 10 and 12) as possible. Assuming (in the worst case scenario) that the reference source used in any of the cellular base stations "slides" towards another with an accuracy of at most 0.1 ppm, the third user (base station 14) can collide with another user when the third user's time slot has "slid" more than half a TDMA slot. However, given an accuracy of 0.1 ppm, this potential "collision" could occur only after about 45 minutes. It is highly likely that at least one of the mobile terminal users would have hung up long before then. If not, then a traffic slot could be reallocated by one of the private radio base stations before the 45 minutes are up.

Figure 10:
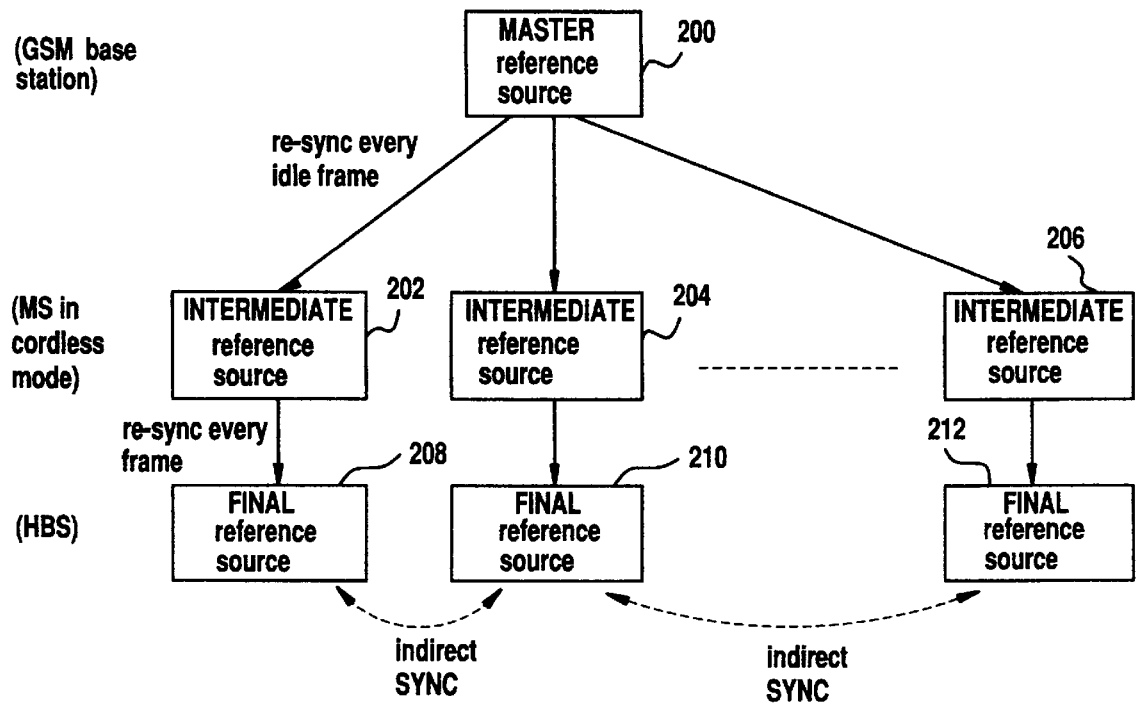
FIG. 10 is a top level schematic block diagram that illustrates a method and apparatus for synchronizing a plurality of private base stations and cellular mobile terminals, which are operating in the coverage area of a cellular mobile network, in accordance with the preferred embodiment of the present invention.

FIG. 10 is a top level schematic block diagram that broadly illustrates a method and apparatus for synchronizing a plurality of private base stations and cellular mobile terminals, which are operating in the coverage area of a cellular mobile network, in accordance with the preferred embodiment of the present invention. A master reference source 200 is used to synchronize the timing and frequency of a plurality of intermediate or "slave" reference sources (202, and 204 to 206). In the preferred embodiment, the master reference source is the reference source used in a GSM base station, and the intermediate or "slave" reference sources are the reference sources used in GSM mobile terminals. The final reference sources are the reference sources used in the respective private base stations that the "slave" reference sources (terminals) are tuned to. Consequently, since the plurality of intermediate reference sources are synchronized with the master reference source, the plurality of final reference sources (private base stations) are indirectly synchronized with each other. Nevertheless, even if a plurality of master reference sources were to be used, the "sliding" rate for the allocated slots would still be reduced considerably (e.g., by a factor of 10–100) provided the master reference sources use an accurate reference (e.g., 0.05 ppm).

If a plurality of private radio base stations are operating with cellular mobile terminals in a cordless mode (e.g., covering several residences or a business), but they are outside the coverage area of a cellular network, a dummy or "pilot" transmitter can be used to synchronize all of the private base stations. For example, the "pilot" transmitter can be a conventional, inexpensive private base station transmitter that transmits dummy information on a single carrier. The timing of the dummy information and the frequency of the transmitted signal can be used for synchronization purposes by the private base stations. Preferably, the reference source in the "pilot" transmitter would be highly accurate (e.g., accuracy of 0.05 ppm or better).

It should be understood that the above-described synchronization of the private base station can also be obtained without the intermediate action of the of the mobile terminal, by placing a downlink receiver directly in the private base station itself. This downlink receiver can then tune to the control channel of the strongest cellular base station and retrieve the reference directly. However, this alternative would add to the cost of the private base station, since the private base station typically contains only an uplink receiver in order to receive the signals from the mobile terminals. Therefore, it is more cost-effective to utilize the downlink receiver of the mobile terminal, with the mobile terminal functioning as an intermediary for synchronization purposes.

Additionally, as illustrated above with respect to the preferred embodiment, the method and apparatus for synchronization is described for the GSM. However, the present invention is not intended to be limited to a specific network, and can include any mobile network in which a mobile terminal can periodically "listen" to the mobile network's control signals while operating in the traffic mode. In particular, all mobile networks that use an "idle" or similar period of time to check the status of certain base stations (e.g., in order to prepare for handovers to other base stations) can be used.

Although a preferred embodiment of the method and apparatus of the present invention has been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for synchronizing at least one of a plurality of cordless private radio system base stations with a mobile communications network including a plurality of base stations, each cordless private radio system base station operating independently of the mobile communications network, said method comprising the steps of:

transmitting a first message including timing information from the plurality of base stations;

tuning a mobile communications terminal to receive the first message having a strongest signal from one base station of the plurality of base stations;

receiving said first message of the one base station at the mobile communications terminal;

synchronizing said mobile communications terminal with said first message;

transmitting a second message including said timing information from said mobile communications terminal;

receiving said second message at said at least one of the plurality of cordless private radio system base stations; and synchronizing said at least one of the plurality of cordless private radio system base stations in accordance with said second message.

2. The method according to claim 1, wherein the step of receiving said second message further comprises the steps of:

receiving said second message at said plurality of cordless private radio system base stations; and synchronizing said plurality of cordless private radio base stations in accordance with said second message.

3. The method according to claim 1, wherein said step of receiving said second message further comprises the step of receiving said second message during a traffic connection between said at least one of the plurality of cordless private radio system base stations and said mobile communications terminal.

4. The method of claim 1, further comprising the step of updating the first message received by the mobile communications terminal when an idle frame occurs in a traffic channel between the mobile communications terminal and said at least one of the plurality of cordless private radio system base stations.

5. The method of claim 1, further comprising the step of adaptively allocating substantially orthogonal time slots between the plurality of cordless private radio system base stations.

6. A system for use in synchronizing at least one of a plurality of cordless private radio system base stations with a mobile communications network including a plurality of base stations, said system comprising:

said plurality of base stations for generating and transmitting a plurality of first messages including timing information;

a mobile terminal for tuning to receive the first message having a strongest signal from one base station of the plurality of base stations, said mobile terminal for receiving and synchronizing with the first message from the one base station; and said at least one cordless private radio system base station operating independently of the mobile communications network for receiving and synchronizing with a second message transmitted by the mobile terminal in response to receiving the first message.

7. The system according to claim 6, wherein said mobile communications network comprises a GSM network.

8. The system according to claim 6, wherein said mobile terminal includes a cordless mode for communicating with at least one of the plurality of cordless private radio system base stations, and a cellular mode for communicating with the mobile communications network.

9. The system of claim 6, wherein said first message includes a control channel burst transmitted on a cellular broadcast channel.

10. The system of claim 6, wherein the second message includes an uplink burst.

11. The system of claim 6, wherein the at least one cordless private radio system base station includes means for adaptively allocating substantially orthogonal time slots therebetween.

12. The system of claim 6, wherein each base station further includes means for updating the first message received by the mobile terminal when an idle frame occurs in a traffic channel between the mobile terminal and said at least one of a plurality of cordless private radio system base stations.

* * * * *

UNITED STATES PATENT AND TRADEMARK OFFICE
CERTIFICATE OF CORRECTION

PATENT NO. : 5,898,929
DATED : Apr. 27, 1999
INVENTOR(S) : Haartsen

It is certified that error appears in the above-identified patent and that said Letters Patent is hereby corrected as shown below:

Column 1, line 22     Replace "(DAMPS)"
                                         With -- (D-AMPS)--

Signed and Sealed this

Fifteenth Day of February, 2000

*Attest:*

Q. TODD DICKINSON

*Attesting Officer*     *Commissioner of Patents and Trademarks*

UNITED STATES PATENT AND TRADEMARK OFFICE
CERTIFICATE OF CORRECTION

PATENT NO. : 5,898,929
DATED : Apr. 27, 1999
INVENTOR(S) : Haartsen

It is certified that error appears in the above-identified patent and that said Letters Patent is hereby corrected as shown below:

On the title page, item

Item [73]      Replace "L/M"
With --L M--

Column 1, line 22      Replace "(DAMPS)"
With --(D-AMPS)--

Signed and Sealed this

Twenty-seventh Day of June, 2000

Attest:

Q. TODD DICKINSON

*Attesting Officer*      *Director of Patents and Trademarks*